United States Patent [19]

Baker et al.

[11] Patent Number: 5,508,734

[45] Date of Patent: Apr. 16, 1996

[54] METHOD AND APPARATUS FOR HEMISPHERIC IMAGING WHICH EMPHASIZES PERIPHERAL CONTENT

[75] Inventors: Robert G. Baker, Delray Beach, Fla.; Kevin Kettler, Pittsburgh, Pa.; Gustavo A. Suarez, Boca Raton, Fla.; Kenneth A. Uplinger, Austin, Tex.; Candace J. F. Freedenberg, Poughkeepsie, N.Y.

[73] Assignee: International Business Machines Corporation, Armonk, N.Y.

[21] Appl. No.: 281,331

[22] Filed: Jul. 27, 1994

[51] Int. Cl.$^6$ .................................................. H04N 7/18
[52] U.S. Cl. .............................. 348/36; 348/53; 348/580
[58] Field of Search .................................. 348/36, 37, 38, 348/39, 53, 580; H04N 7/18

[56] References Cited

U.S. PATENT DOCUMENTS

| | | | |
|---|---|---|---|
| 4,070,098 | 1/1978 | Buchroeder | 359/725 |
| 4,125,862 | 11/1978 | Catano | 348/445 |
| 4,170,400 | 10/1979 | Bach et al. | 385/119 |
| 4,322,726 | 3/1982 | Collier et al. | 345/7 |
| 4,559,555 | 12/1985 | Schoolman | 348/53 |
| 4,747,675 | 5/1988 | Nagler | 359/643 |
| 4,772,942 | 9/1988 | Tuck | 348/38 |
| 4,985,762 | 1/1991 | Smith | 348/39 |
| 5,023,725 | 6/1991 | McCutcheon | 348/38 |
| 5,040,055 | 4/1991 | Smith | 348/39 |
| 5,097,325 | 3/1992 | Dill | 348/37 |
| 5,185,667 | 2/1993 | Zimmerman | 348/36 |

Primary Examiner—Howard W. Britton
Attorney, Agent, or Firm—Daniel E. McConnell

[57] ABSTRACT

A system for electronic imaging of a hemispheric field of view includes a camera for receiving optical images of the field of view and for producing output data corresponding to the optical images. The camera includes an optical assembly for producing images throughout a hemispheric field of view for optical conveyance to an imaging device or photographic film. The optical system assembly has lens components that selectively emphasize the peripheral content of the hemispheric field of view. An electronic imaging device within the camera or a film-to-digital date conversion system provides digitized output signals to input image memory or electronic storage devices. A transform processor selectively accesses and processes the digitized output signals from the input image memory according to user-defined criteria and stores the signals in output image memory. The signals in the output image memory can then be displayed according to the user-defined criteria.

44 Claims, 8 Drawing Sheets

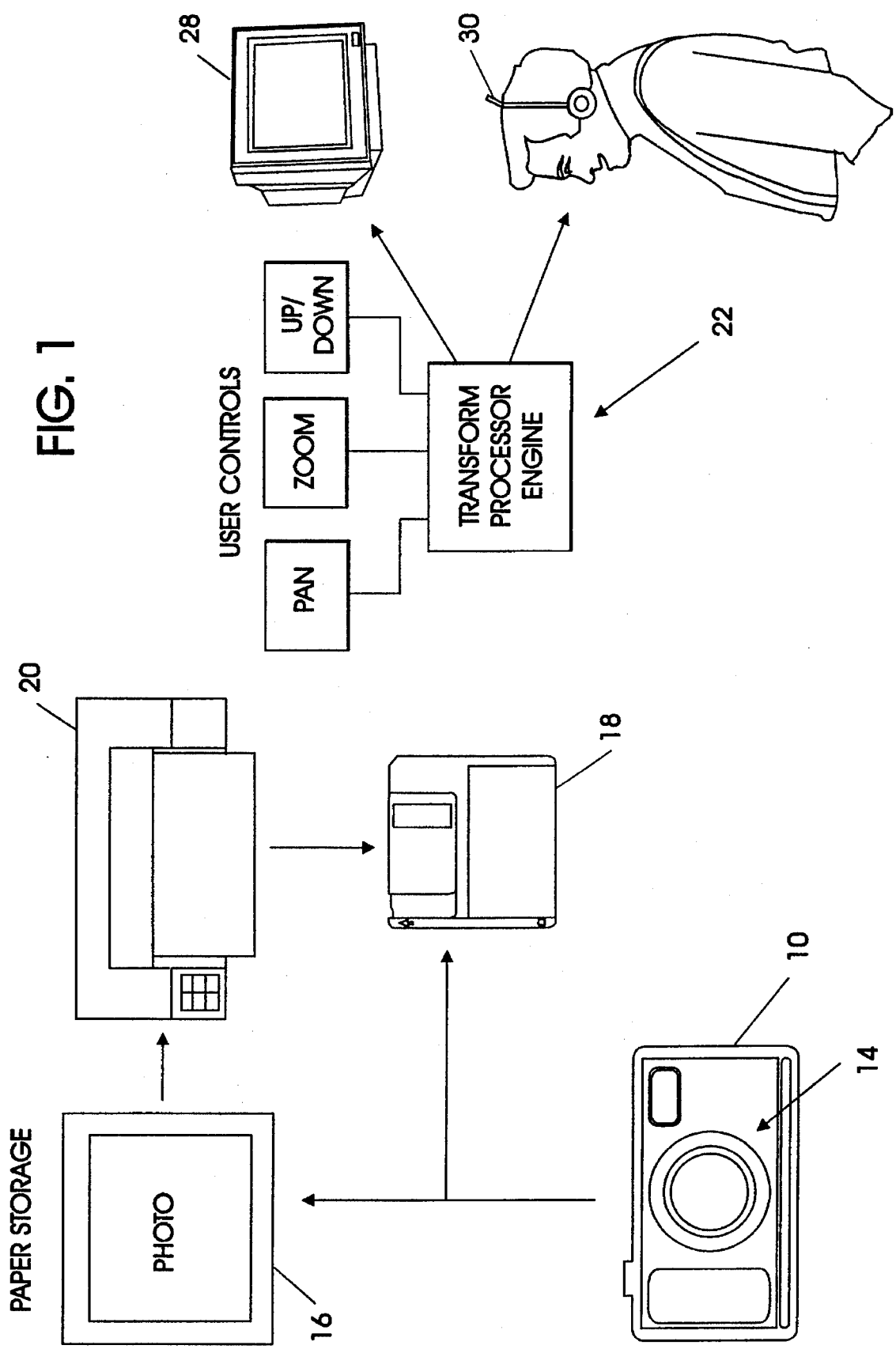

BORDER OF IMAGER

ANGULAR KEY TO VISUAL FIELD

BORDER OF IMAGER

/ = MULTIPLE LINES, SUCH AS A BUS

METHOD AND APPARATUS FOR HEMISPHERIC IMAGING WHICH EMPHASIZES PERIPHERAL CONTENT

BACKGROUND OF THE INVENTION

The present invention relates generally to visual imaging systems, and more particularly to visual imaging systems and techniques which provide useful electronic manipulation of wide angle hemispheric scenes.

The collection, storage, and display of large areas of visual information can be an expensive and difficult process to achieve accurately. With the recent increased emphasis on multimedia applications, various methods and apparatus have been developed to manage visual data, A unique class of multimedia data sets is that of hemispheric visual data. Known multimedia methods and apparatus attempt to combine various multimedia imaging data, such as still and motion (or video) images, with audio content using storage media such as photographic film, computer diskettes, compact discs (CDs), and interactive CDs. These are used in traditional multimedia applications in various fields, such as entertainment and education. Non-multimedia applications also exist that would employ hemispheric visual data, such as in security, surveillance, unmanned exploration, and fire and police situations. However, as will be described below, the known methods and apparatus have certain limitations in capturing and manipulating valuable information of hemispheric scenes in a rapid (i.e., real-time) and cost-effective manner.

One well-known multimedia technique is used at theme parks, wherein visual information from a scene is displayed on a screen or collection of screens that covers almost 360 degrees field of view. Such a technique unfortunately results in the consumption of vast quantities of film collected from multiple cameras, requires specially-designed carriages to carry and support the cameras during filming of the scene, and necessitates synchronization of shots during capture and display. The technique is also limited in that the visual image cannot be obtained with a single camera nor manipulated for display, e.g., pan, tilt, zoom, etc., after initial acquisition. Hence, this technique, while providing entertainment, is unable to fulfill critical technical requirements of many functional applications.

Other known techniques for capturing and storing visual information about a large field of view (FOV) are described in U.S. Pat. Nos. 4,125,862; 4,442,453; and 5,185,667. In U.S. Pat. No. 4,125,862, a system is disclosed that converts signal information from a scene into digital form, stores the data of the digitized scene serially in two-dimensional format, and reads out the data by repetitive scan in a direction orthogonally related to the direction in which the data was stored. U.S. Pat. No. 4,442,453 discloses a system in which a landscape is photographed and stored on film. The film is then developed, with display accomplished by scanning with electro-optical sensors at "near real-time" rates. These techniques, however, do not provide instant visual image display, do not cover the field of view required for desired applications (hemispheric or 180 degrees field of view), do not generate visual image data in the format provided by the techniques of this invention, and are also not easily manipulated for further display, e.g., pan, tilt, etc.

The technique disclosed in the U.S. Pat. No. 5,185,667 overcomes some of the above-identified drawbacks in that it is able to capture a near-hemispheric field of view, correct the image using high speed circuitry to form a normal image, and electronically manipulate and display the image at real-time rates.

For many hemispheric visual applications, however, a system of the type described by the '667 patent has limitations in obtaining sufficient information of critical and useful details. This is particularly true when the camera is oriented with the central axis of the lens perpendicular to the plane bounding the hemisphere of acquisition (i.e. lens pointing straight up). In such applications, the majority of critical detail in a scene is contained in areas of the field along the horizon and little or no useful details are contained in central areas of the field located closer to the axis of the lens (the horizon being defined as the plane parallel to the image or camera plane and perpendicular to the optical axis of the imaging system). For example, in surveillance, the imaging system is aimed upward and the majority of the critical detail in the scene includes people, buildings, trees, etc.—most of which are located within only a few degrees along the horizon (i.e., this is the peripheral content). Also, in this example, although the sky makes up the larger central area of the view, it contains little or no useful information requiring higher relative resolution.

To obtain sufficient detail on the critical objects in the scene, the technique should be able to differentiate between the relevant visual information along the horizon and the remaining visual information in the scene in order to provide greater resolution in areas of higher importance. The system described by the '667 patent does not differentiate between this relevant visual information contained along the horizon and the remaining visual information in this scene. Thus, it fails to yield a sufficient quality representation of the critical detail of the scene for projected applications.

Instead, techniques described above concentrate on obtaining, storing, and displaying the entire visual information in the scene, even when portions of this information are not necessary or useful. To obtain the near-hemispheric visual information, such techniques require specific lens types to map image information in the field of view to an image plane (where either a photographic film or electronic detector or imager is placed). Known examples of U.S. Pat. No. 5,185,667 and U.S. Pat. No. 4,442,453, respectively use a fish-eye lens and a general wide-angle lens. As these lenses map information of a large field without differentiation between the central and peripheral areas, information from the periphery will be less fully represented in the image plane than from the central area of acquisition.

U.S. Pat. No. 4,170,400 describes a wide-angle optical system employing a fiber optic bundle that has differing geometric shapes at the imaging ends. Although this is useful in itself for collecting and repositioning image data, bending of light is a natural characteristic of optical fibers and not exclusive to that patent. Further, U.S. Pat. No. 4,170,400 employs a portion of a spherical mirror to gather optical information, rendering a very reduced subset of the periphery in the final imaging result. This configuration is significantly different from the multi-element lens combination described in the present invention.

Imperfections in the image representation of any field inherently result from the nature of creating an image with any spherical glass (or plastic) medium such as a lens. The magnitude of these imperfections increases proportionally to the distance a point in the field is from the axis perpendicular to the optical imaging system. As the angle between the optical axis and a point in the field increases, aberrations of the corresponding image increase proportional to this angle cubed. Hence, aberrations are more highly exaggerated in the peripheral areas with respect to more central areas of a hemispheric image.

Although the lens types above achieve a view of a large field, the valuable content from the peripheral areas lacks in potential image quality (resolution) mapping because the imaging device and system does not differentiate between these areas and the central areas of less valuable detail. Often, the difference between the imaging capabilities between the two areas is compensated for by using only the central portion of a lens to capture the scene ("stopping the lens down"). This works in effect to reduce the image quality of both areas such that the difference in error is a lesser percentage of the smallest area even the central area can resolve. Simultaneously, this compensation technique further degrades the performance of the lens by limiting the amount of light which is allowed to enter the lens, and thus reducing the overall intensity of the image.

More typically, the peripheral content imaged by a conventional lens is so degraded in comparison with the central area that the lens allows for only a minimal area of the periphery to be recorded by the film or electronic imager. As a result of these "off-axis" aberrations inherent to large fields, the relevant information of the horizon in the scene can be underutilized or worse yet—lost.

Another limitation in Pat. No. 5,185,667 is its organization for recording only views already corrected for perspective. The nature of that methodology is that the specific view of interest must be selected and transformed prior to the recording process. The result is that no additional selection of views can be accomplished after the storage process, reducing system flexibility from the user's perspective.

Hence, there is a demand in the industry for single camera imaging systems that efficiently capture, store, and display valuable visual information within a hemispheric field of view containing particularly peripheral content, and that allow electronic manipulation and selective display of the image post-acquisition while minimizing distortion effects.

SUMMARY OF THE INVENTION

The present invention provides a new and useful visual imaging system that emphasizes the peripheral content of a hemispheric field of view using a single camera. The captured visual information can be stored as a single image using conventional chemical-based (film) or electronic data storage techniques. The invention allows user-selected portions of a hemispheric scene to be electronically manipulated and displayed from the stored visual database in a real-time and cost-effective manner.

The visual imaging system of the present invention involves either a still image or a moving picture camera, electronic or otherwise, having a lens with enhanced peripheral content imaging capabilities. The lens provides an enhanced view of the valuable information in the scene's periphery by imaging a field to the image plane such that the ratio of the size of the smallest detail contained within the periphery of the scene to the size of the smallest resolving pixel of an image device is increased. For this to be accomplished, the peripheral content must map to a larger percentage of a given image detector area and, simultaneously, the mapped image of the central area of the scene must be minimized by the lens so that it does not interfere with the peripheral content now covering a wider annulus in the image plane. Information in the image plane is then detected by an imager device (either a photographic film or electronic imager or video detector array). The detected information of the entire hemispheric scene is then stored as a single image in memory using traditional methods.

When a portion of the scene is to be displayed, the image information relating to the relevant portion of the scene is instantaneously retrieved from memory. A transform processor subsystem electronically manipulates the scene for display as a perspective-correct image on a display device, such as a conventional monitor or TV, as if the particular portion of the scene had been photographed with a conventional camera. The transform processor subsystem compensates for the distortion or difference in magnification between the central and peripheral areas of the scene caused by the lens by applying appropriate correction criteria to bring the selected portion of the scene into standard viewing format. The transform processor subsystem can also more fully compensate for any aberrations of the enhanced peripheral image because of the image's improved resolution as it covers a larger portion of the image device (increased number of pixels used to detect and measure the smallest detail in the periphery image). More pixels equates to more measurement data, hence more accurate data collection.

The stored image can also be manipulated by the transform processor subsystem to display an operator-selected portion of the image through particular movements, such as pan, zoom, up/down, tilt, rotation, etc.

By emphasizing the peripheral content of a scene, the visual imaging system can use a single camera to capture the relevant visual information within a panoramic field of view existing along the horizon, while being able to conventionally store and easily display the scene, or portions thereof, in real-time. Using a single optical system and camera is not only cost-effective but keeps all hemispheric visual data automatically time-synchronized.

One advantage of the present invention is that the unique visual imaging system lens can capture information from a hemispheric scene by emphasizing the peripheral portion of the hemispheric field of view and thus provide greater resolution with existing imaging devices for the relevant visual information in the scene. As an example, if an ordinary fish-eye lens focuses the lowest 15 degrees up from the horizon on 10% of the imager at the objective plane and the peripheral-enhancing lens focuses that same 15 degrees on 50% of the imager, there is a 5-fold increase in resolution using the same imaging device. Depending on the application and exact formulation of the lens equations, there will be at least a 5× increase in resolving power by this lens/imager combination.

Another advantage of the present invention is that the captured scene information having an enhanced peripheral content can be stored as a single image using conventional storage techniques, but need not be stored in standard formats only.

Still another advantage of the present invention is that the image can be read out from storage and electronically manipulated at any time after acquisition to provide flexibility in display options, allowing post-acquisition selection of any particular view desired.

Another advantage is that the system can generate motion video from a reduced set of still images through interpolation and inter-scene warping. Still other advantages of the present invention should become apparent from the following detailed description and appended claims.

BRIEF DESCRIPTION OF THE DRAWINGS

The following detailed description is made with reference to the accompanying Figures, wherein like reference numerals refer to like parts.

In the annexed drawings:

FIG. 1 is a schematic illustration of the various components and organization of the visual imaging system of the present invention;

DESCRIPTION OF THE PREFERRED EMBODIMENT(S)

Figure 2A:
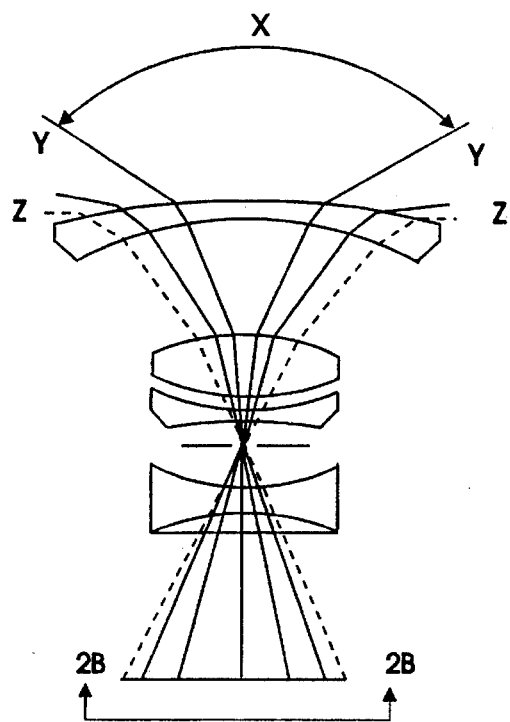
FIG. 2A is a cross-sectional diagram of a wide angle lens system of the prior art.
Figure 2B:
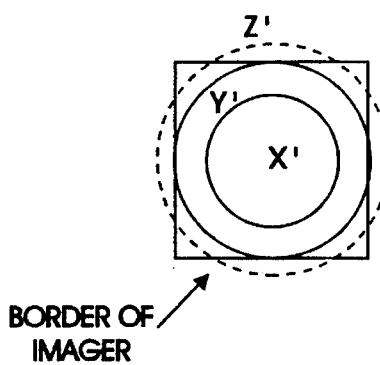
FIG. 2B is a box diagram indicating the field input and output rays and the resulting relative field coverage a lens of the prior art typically provides in an image plane for detection by an imager device.
Figure 2C:
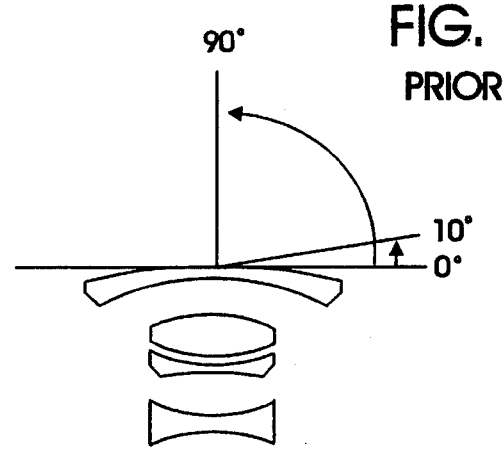
FIG. 2C is a cross-sectional diagram of a lens system of the prior art indicating angular key to visual field.

The invention will be defined initially with a brief description of the principles thereof.

Principles of the Present Invention

The present invention stems from the realization by the inventors that in many of the technical hemispheric field applications, where the image detector is parallel to the horizon, much of the relevant visual information in the scene (e.g., trees, mountains, people, etc.) is found only in a small angle with respect to the horizon. Although the length of the arc from the horizon containing the relevant information varies depending upon the particular application, the inventors have determined that in many situations, almost all the relevant visual information is contained within about 10 to 45 degrees with respect to the horizon.

To maximize data collection and resolution for analysis and/or display of the relevant visual information located in this portion of the hemispheric scene, it is desirable to maximize the dedication of the available image detection area to this peripheral field portion. To accommodate this, it is necessary that the "central" portion of the scene (from 45 to 90 degrees with respect to the horizon) cover only the remaining areas of the imager plane so as not to interfere with light from the periphery.

In many cases, since the "central" area contains less detailed information, such as a solid white ceiling or a clear or lightly-clouded sky, it is allowable to maximize completely the dedication of the available image detection area to the peripheral field portion by reducing the portion of the imager device representing the "central" area to near zero. Of course, in certain instances, it is desirable to analyze this less detailed information, but this portion of the scene can be minimized to some extent without significant degradation of such visual information. As will be described herein in more detail, the present invention provides two manners (Example I and Example II) for capturing, storing, and selectively displaying the critical visual information in a scene for many important applications.

System Organization and Components

Referring now to the drawings, and initially to FIG. 1, the visual imaging system of the invention includes a still image or moving picture camera 10, having a lens, indicated generally at 14, designed to capture and enhance the peripheral content of a hemispheric scene. The captured scene can be stored onto an assortment of media, e.g., photographic film 16, electronic storage 18, or other conventional storage means. Electronic storage 18 is preferred because of the ease of electronic manipulation thereof. Additionally, photographic film 16 requires an image scanner 20 or other capture-and-conversion method to change the image into electronic format before electronic manipulation can be performed.

The stored electronic image data is then selectively accessed by a transform processor engine 22 and can be electronically manipulated according to user-defined criteria, such as pan, up/down, zoom, etc. The transform processor 22 corrects the image for display on a conventional display device 28 in a normal viewer format or on head-mounted displays 30, in which integrated orientation-sensing devices having, for example, wearer eye focus or head position detection function, can be used to manipulate and define the user controls.

I. Image Acquisition a. Camera

The camera 10 for the visual imaging system is an optical device that is capable of receiving a focused image from a lens and transforming that image into an electronic signal or into hard copy storage such as photographic film. Various types of cameras for wide-angle viewing are known to those in the art, such as 35 mm cameras, 8 mm cameras, NTSC, RS170 and HDTV-type cameras. The present invention is designed to be compatible with most commercially-available two-dimensional cameras, with scaling of the lens geometries. It also has the technological capability to be applied to three-dimensional cameras. The camera can be mounted and supported in a conventional manner.

b. Lens With Enhanced Peripheral Content

The fundamental principle behind the enhanced peripheral content lens is the selective magnification of the periphery and the focusing of more of that content on the objective plane. This recognizes the current limitations of imaging devices and film with regard to resolution. As such, the more of the peripheral content that can be focused on the objective plane surface, the more points of data that can be resolved with a given density of imaging device or material. Therefore, for this new class of selective magnification lenses, the surface area of the imaging plane reserved for peripheral content will be large relative to the central content and roughly similar for all lenses in this class, regardless of whether the lens is designed for 1–10 degree peripheral emphasis or 1–45 degree peripheral emphasis. However, it should be noted that the lens with 1–10 degree emphasis will have much better resolution for the same objects than the lens with 1–45 degree emphasis.

The lens 14 for camera 10 provides a collection of data for enhanced digital processing of the peripheral portion of a given field of view. The lens uniquely achieves this by filling the greater available area of an imager device with the peripheral areas rather than the central areas of the captured scene.

Figures 3A, 3B, 3C:
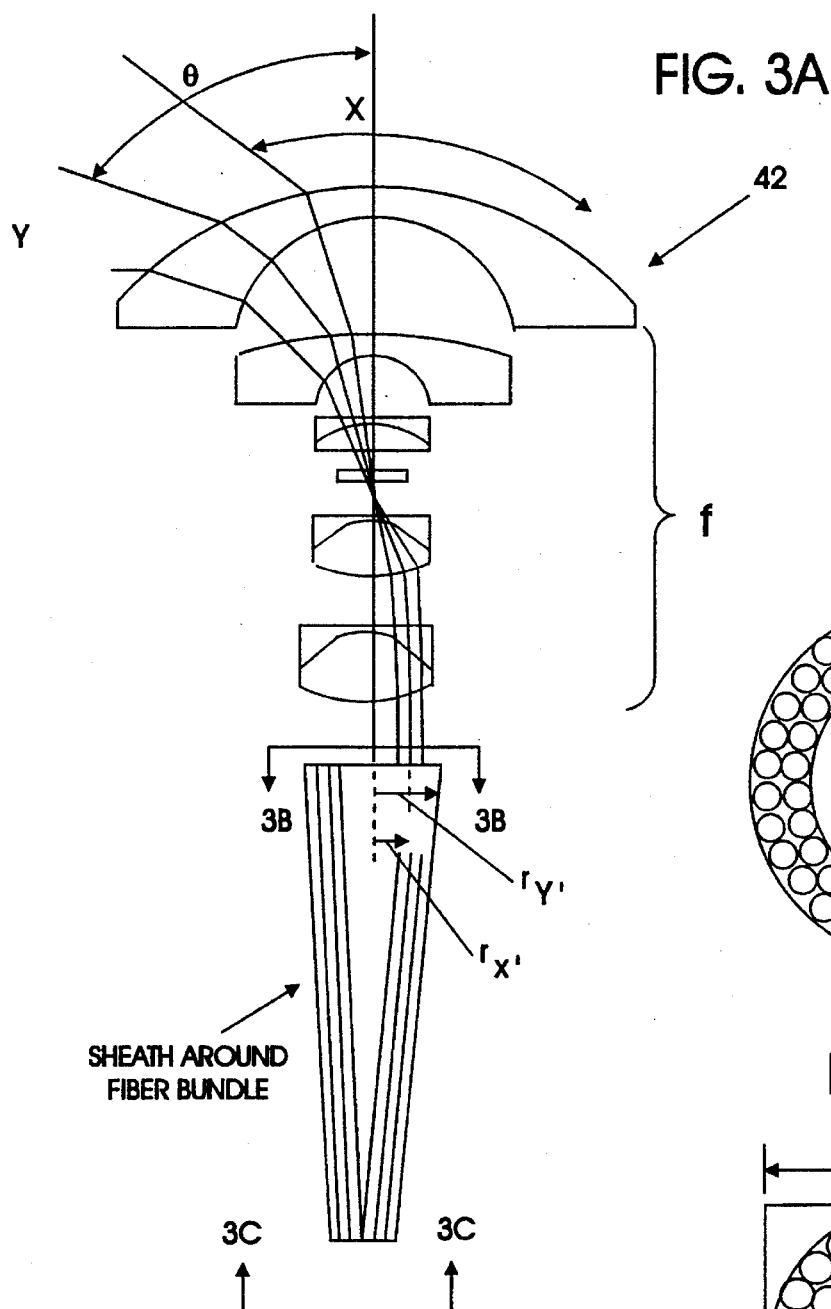
FIG. 3A is a cross-sectional diagram of one embodiment of a peripheral image enhancing lens system of the present invention.
FIG. 3B is a box diagram of the annulus field input of a bundled fiber array portion of the lens system of FIG. 3A.
FIG. 3C is a box diagram of the imager interface output of a bundled fiber array portion of the lens system of FIG. 3A.
Figure 4A:
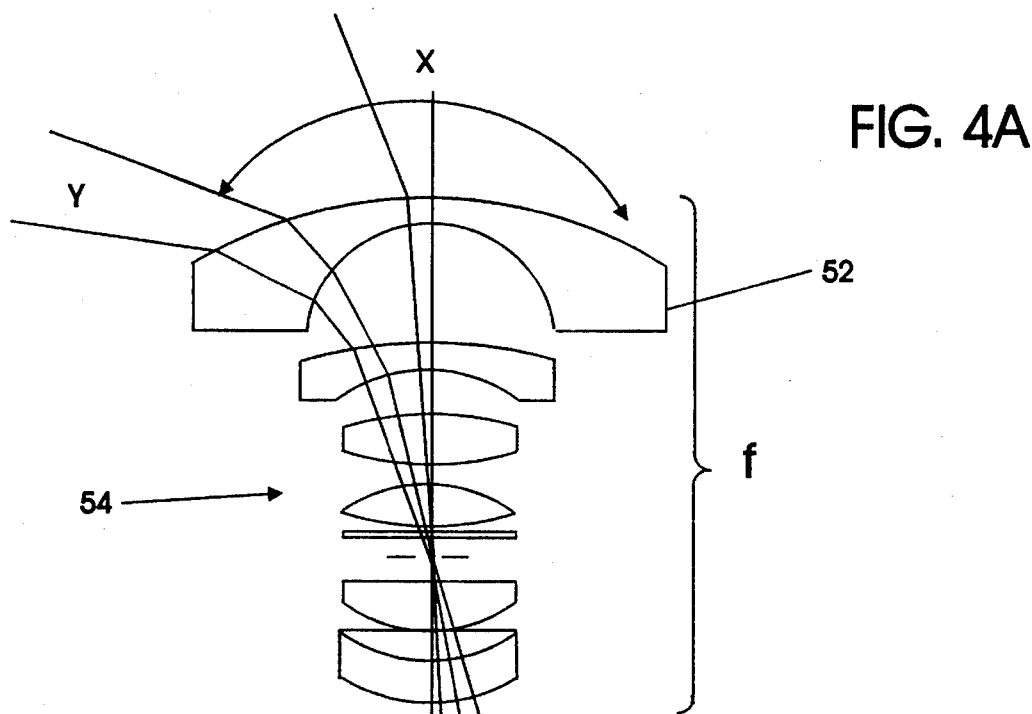
FIG. 4A is a cross-sectional diagram of another embodiment of a peripheral image enhancing lens system of the present invention.
Figure 4B:
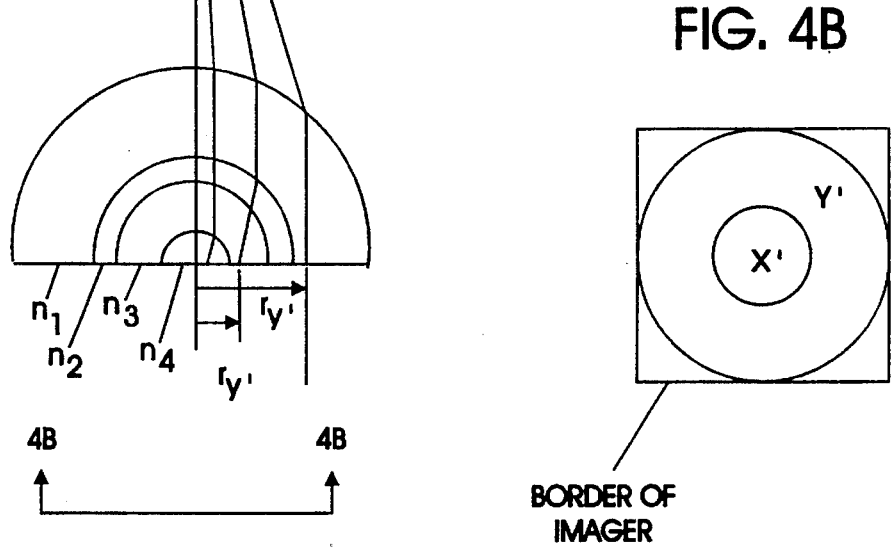
FIG. 4B is a box diagram indicating the field input and output rays indicating the resulting field coverage of the lens system of FIG. 4A.

A periphery-enhancing optical system suitable for achieving the goals of the present invention can be configured in various ways to present an image of the field free of detrimental values of critical aberrations. Two examples or embodiments are preferred. Example I, as illustrated by FIGS. 3A–3C, preferably is a multi-medium system comprising a wide-angle multi-element optical lens and a fiber optic imager device. Example II as illustrated by FIGS. 4A–4B, preferably is a combination system comprised of multiple refractive optical elements, one of which is of gradient index material and hemispherical in shape. The inventors define that other configurations relying on binary optics could also be utilized to accomplish similar results.

The system of Example I is best suited for applications where the capture of the minimal information contained in the central area is irrelevant. A coordinated fiber bundle array 40, either rigid or flexible, carefully aligned and assembled by methods known to those skilled in the art, is used to capture a peripheral annulus of the wide field image provided by the multi-element wide field lens. The multi-element wide field lens 42 therefore, although covering the same field as standard wide field lenses, is required to provide a larger image of the entire field. This can be accomplished by those skilled in the art by scaling a standard lens to a larger focal length until the desired image size is reached. (REF. Journal of the Optical Society of America, 1964, Lens Designs Presented by Miyamota; Smith, W. J., Modern Lens Design, Ch. 5.4 "Scaling a Design", McGraw-Hill, Inc. 1992. Also see U.S. Pat. No. 4,256,373 by M. Horimoto for additional wide-field lenses.)

The fibers, arranged in a specific mechanical manner, deliver the information in a geometrically annular shape from the peripheral image area to either the rectangular or circular shape of a specific imaging device. Specific configurations can be devised for desired peripheral coverage (up to 10 degrees through 45 degrees) and matched to required image detector plane geometry. (REF. Sect. 13, Fiber Optics, Handbook of Optics, McGraw-Hill Inc., 1978.) Referring to FIG. 3A, for a desired angle θ (theta), a standard wide-field lens design is scaled in "f", the focal length, to provide $r_y$, such that the minimum pick-up area of the camera imaging device (2r') is met. In the "Camera/Imager Interface" portion of the figure, the equation for fiber bundle radius r' as related to the imager is:

Area at imager=$\pi r_y^2 - \pi r_x^2 = \pi(r_y^2 - r_x^2)$

Imager length=2r', where $r' = \sqrt{(r_y^2 - r_x^2)}$

A configuration in the form of Example I achieves an image in which the peripheral portion (0–45 degrees with respect to the horizon) of the field of view preferably encompasses between approximately 90% to 100% of the entire usable area of the imager device, rather than the 35% or less that is typical with commercially-available wide-angle, fish-eye, or other conventional lenses. A configuration in the form of Example II achieves an image in which the peripheral portion preferably encompasses between 50% to 70% of the usable area of the imaging device surface.

The system of Example II is best suited for applications where all information contained in the field of view is relevant, although to differing degrees. The combination system of Example II relies on the principle use of a Bravais System where a hemispherical lens 52 or a combination of lenslets magnify an object to an image, wherein the object and image lie in the same plane. In this case, the hemispherical lens 52 is made of gradient index material such that points impinging the image plane incur different factors of magnification depending on what index of refraction and what portion of the hemispherical curve or lenslets they pass through. This concept is used in combination with a multi-element refractive lens 54 that is designed to capture a wide field of view and also compensate for the color aberration induced by insertion of the hemispherical lens. This color compensation can be designed by those skilled in the art by using a computer optimization routine.(REF. M. Horimoto and U.S. Pat. No. 4,256,373.) By use of the hemispherical gradient index unit with a wide field multi-element lens, the portion of the camera dedicated to the periphery is increased, thereby increasing the relative resolution of information detectable by the imaging device sensing elements. With the gradient index hemisphere, index values decrease from the center, such that:

$n_1 < n_2 < n_3 < n_4$

The operation of the optical systems is schematically illustrated in FIGS. 2A–B, 4A and 4B. In FIG. 2A, arc X represents the field of view of the "center" of the lens system, while the arc Y represents the practically usable portion of the "peripheral" field. The areas X' and Y' in FIG. 2A represent the resultant image focal locations on the imager at the object plane. Arc Z and area Z' represent areas outside the normal imaging range of the lens. (No actual demarcation lines would exist in actual use; this is merely for explanatory purposes.)

FIG. 2A represents a typical wide-angle type lens 32, while FIG. 4A represents a lens constructed according to the principles of the present invention. As should be apparent from comparing FIGS. 2A and 4A, a typical wide-angle type lens has a fairly significant portion of the image surface dedicated to the central field of the lens; while the lens constructed according to the present invention has a fairly significant portion of the objective surface dedicated to the peripheral field—and consequently less of the surface dedicated to the central field.

The portion of the image surface used for the peripheral portion of the scene (as compared with the central portion of the scene) can vary depending upon the particular prescription of lens specified, which is selected to capture items of interest for a given application. For example, if the imaging system is used to capture a panorama of an outdoor scene, the relevant visual information may be contained within 10 degrees of the horizon. The lens of the present invention can thus be designed to enhance only the field of view within 10 degrees of the horizon. On the other hand, if the imaging system is being used to capture a room scene within a building, the relevant visual information may include objects on walls and thus be contained within about 45 degrees from the horizon. A peripheral enhancing lens can thus also be designed to enhance the field of view up to 45 degrees from the horizon. Of course, the enhanced portion of the field of view depends upon the needs of the particular application, with the enhanced portion preferably falling somewhere between these two extremes. In any case, the principles of the present invention can be applied to these types of situations with equal success, with any appropriate corrections being made with the image transform processors, as will be described herein in more detail.

As illustrated in FIG. 3A, a preferred form of the Example I form of optical system comprises a standard wide field lens 42 and a coordinated fiber array 40. The focal length of the wide field lens is scaled in order to match the peripheral field of view desired. The coordinated fiber array consists of an annular input face 44 that collects the image projected from the standard wide field lens. The fiber bundle array then redirects the information from the peripheral view to its output end by total internal reflection. Fibers capable of 3 micron accuracy, covering the area of the annular region, are coordinated into a rectangular or circular shape at their output, depending on the geometry of the corresponding imaging device. The size of output is also matched to the camera imaging device used.

Of course, these system configurations and parameters are only exemplary in nature and other configurations and parameters of the present invention could be used to provide enhanced peripheral imaging capabilities, as should be apparent to those skilled in the art.

c. Imager Device

An electronic camera 10 used for exemplary purposes includes an imager device that records the optical image from the lens at the object plane. For a photographic process, the imaging medium is film, while for an electronic process, the imaging medium is an electronic device such as a charge-coupled device (CCD) or charge-injected device (CID). As indicated previously, electronic processes are typically preferred over photographic processes as they are easier to electronically manipulate. Photographic processes, however, can be preferred in certain situations. Numerous makes and models of film and electronic imaging devices are known to those skilled in the art that provide uniform resolution across the receiving surface.

Figure 5:
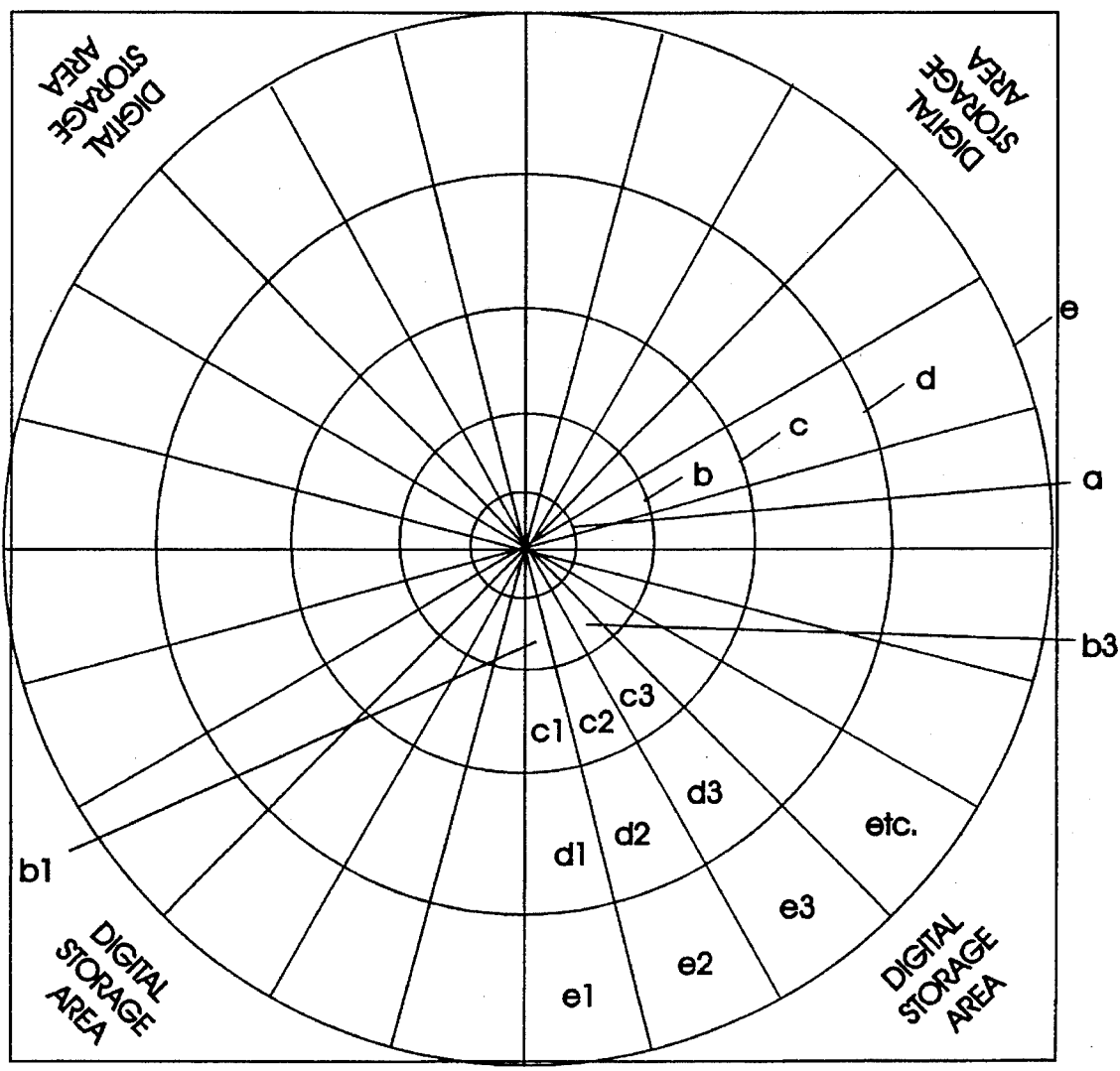
FIG. 5 is a schematic representation of the mapping locations of the lens systems of the present invention resulting upon an imaging device.

When the imager device is used with a lens constructed according to the principles of the present invention, the imager device will collect more information along the horizon than it will from the central area of the hemispheric scene. With only a given limited resolution of either film emulsions or CCD pixel density, the lens focuses more useful information at the objective plane. The peripheral portion of the scene will therefore have a higher relative resolution in the resultant transformed image than the central portion. Thus, the details of any objects along the horizon will be highly accentuated. Further, any distortion (e.g., spherical aberration) that occurs in the peripheral region of the lens will be imaged onto a larger surface and can thus be more easily and fully compensated for. The image mapped onto the imager device can be described by a series of concentric circles, as schematically illustrated in FIG. 5. As an example, each circle a, b, c, d, etc. on the imager device can be described by radii of arbitrary units, e.g., 2, 5, 9, 14, etc., respectively. The radii of the circles depends on the magnification of the different regions of the hemisphere, with the sections of the outer circles having a greater area as the magnification of the peripheral region increases. For example, in an arbitrarily selected illustration case, each concentric circle represents 18 degrees field of view from the horizontal plane, with the outer circumference of the outermost circle being level with the horizon. The inventors have determined that the arc subtending the two outer circles (i.e., 36 degrees from the horizon) contains the relevant information in many hemispheric scenes for many applications (although this value can be varied depending upon the particular application).

Calculating the total circular area of the entire image circle yields 1257 units squared. The area of the three inner circles is 254 units squared. Therefore, the two outer circles contain about 80% of the usable area on the imaging device. Note that the image blocks corresponding to the horizon are spread across more area on the imager device than those in the central area of the image. Thus, the image blocks of the imager device are dominated by objects along the horizon, and those are the area of interest. This correlates to greater resolution for the peripheral areas of the scene.

If for some reason an Example I circular-output optical system is configured with a square or rectangular imaging device, the corner areas of the imaging device are not useful for photographic purposes. However, these areas can be used to store other information, for example, such as digitized audio content or other secondary documentation from the scene, if the imager is radially mapped 1:1 with electronic memory.

II. Image Storage

The image received on the imager device is passed on to the system components for storage. For photographic processes, a storage device might be film; while for electronic processes, the storage device might be electronic storage in the form of random access memories, a conventional diskette or hard file, or video recording tape. The entire display of the scene (along with any secondary documentation) can be stored as a single image on the storage device.

The image is stored in a "warped" form. The warped image is caused not only by the wide-angle nature of the lens (i.e. the "keystoning" effect), but also by the enhanced peripheral field of view of the lens (i.e., magnification along the periphery). The underlying concept is that a partial slice of the scene can be reproduced with the proper aspect ratio for the human visual system (i.e., as a perspective corrected view).

Figure 6:
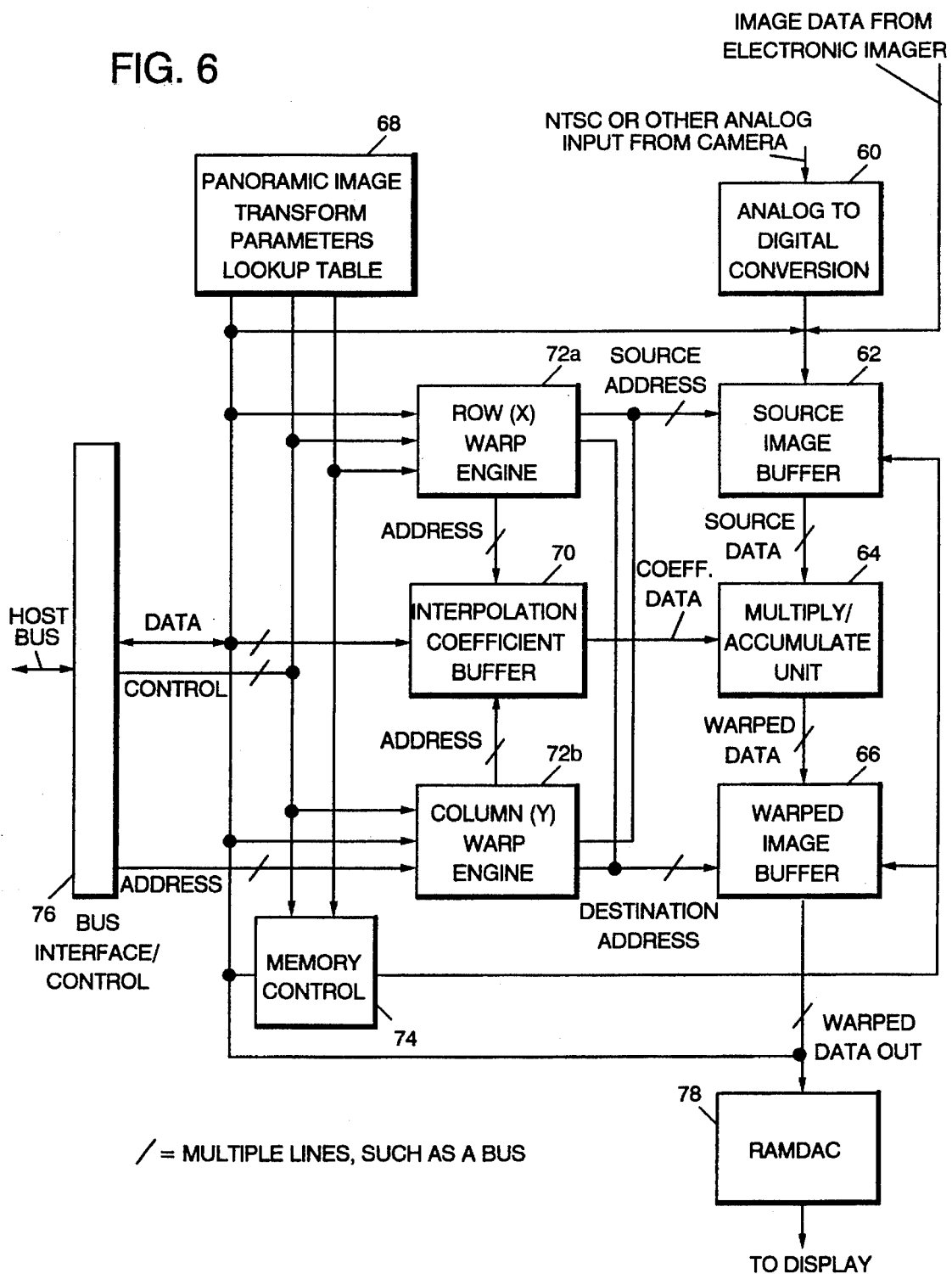
FIG. 6 is a schematic block diagram of the image processing circuitry of the present invention including the transform processor subsystem thereof.

As schematically diagrammed in FIG. 6, the stored image is loaded into the source image buffer 40 if it has been stored in electronic form on a host system such as a personal computer or controller. Alternatively, the image can be brought in for processing without going through storage. As one option, an analog signal from a video camera can connect into an NTSC-to-digital converter 60. This converts the image from analog information into a digital bit map (i.e., into "pixels"). The source image is then loaded into the source image frame buffer 62. However, as indicated previously, any type of camera can be used to provide the electronic input to buffer 62. The buffer preferably operates with sufficient speed so that real-time viewing is possible.

III. Image Retrieval/Display

The stored image can be selectively accessed and transformed for display. If the storage is photographic film, an image scanner may be used to convert the stored image into an electronic format for subsequent manipulation. In order to recreate a proper display of the scene in two dimensions for perspective-correct viewing, processor logic in transform processor engine 22 is utilized. The transform processors may be made of collections of small-scale, medium-scale, large-scale, or very-large-scale integrated (VLSI) circuits, examples of which are image resampling sequencers such as the TMC2301 and TMC2302, commercially available from Raytheon Semiconductors (formerly TRW LSI Products, Inc., LaJolla, Calif.).

In FIG. 6, resampling sequencers control the address sequencing of the pixels in the source image buffer 62 through a multiply/accumulate unit 64, and from there into the warped image buffer 66. The sequencers control the filtering or remapping of 2-dimensional images from a set of Cartesian coordinates (x,y) as defined within each sector (e1, d1, etc.) onto a newly transformed set of coordinates (u,v). The "fish-eye" type of transformations described in U.S. Pat. No. 5,185,667 are based on non-constant second-order derivatives. A different set of second-order derivatives would be employed for the transforms associated with the peripheral-enhancing configurations of the present invention. The sequencers can also handle three-dimensional images by resampling them from a set of Cartesian coordinates (x,y,z) into a new, transformed set (u,v,w). Typically these sequencers can support nearest-neighbor, bilinear interpolation or convolution resampling, and can operate at speeds allowing real-time operation.

Remapped pixel locations (i.e., interpolation "kernels") of more than one pixel in the bit map require an external interpolation coefficient look-up table 68 and the multiply/accumulate unit 64. A table "walk" is typically performed on each source pixel, thus providing a smoother image by summing the products of the original lens image data with the appropriate interpolation coefficients. By capturing the hemispheric lens image data into source image buffer 62, the warp engine can be programmed to perform a perspective correction, much like an inverse keystoning effect. The remapping of the pixel locations is matched to the differential magnification of the particular periphery-enhancing lens system used.

Direct access to the interpolation coefficient look-up table 68 and to the transformation parameters is also desirable to allow dynamic modification of the interpolation algorithm. Thus, a local interpolation coefficient buffer 70 to update the varying transform parameters is included to allow for real-time still and motion image transformations.

The row and column warping engines 72a, 72b of the transform processor 22 supply addresses to the source image buffer 62. The addresses are determined by the interpolation algorithm chosen. The multiply/accumulate unit 64 takes the pixels supplied by the source image buffer 62 under warping engine control and multiplies the pixels together using combinational logic with weighting factors dependent on the algorithm. Compensation for aberration (e.g., spherical aberration) can also be made at this point. Finally, the composed interpolated pixels are sent to the warped image buffer 66. The address location within the warped image buffer is again determined by the warping. The algorithm parameters from look-up table 68 are input to the registers of the row and column warping engines 72a, 72b, as well as into the interpolation coefficient buffer 70.

The memory controller/clock circuitry 74 provides refresh control to the source and warped image buffers 62, 66. In addition, all clock sources are synchronized through this circuitry. The bus interface and control circuitry 76 also provide an interface to the host system bus (i.e., for MCA, ISA, etc.) and the remapping circuitry. This interface logic serves to load control information into the remapping circuitry and to provide a path to transport warped images to the system display buffer (not shown; part of host system), or store images to disk via the system bus prior to warping. An optional random access memory digital-to-analog converter (RAMDAC) 78 provides support for a local display connection if desired.

One feature of the transform processors is the valid source address flag within the transform processor engine. This allows the user to construct abutting subimages in the (x,y) plane without danger of edge interference. Thus, edge detection of the unused areas outside the circular image of FIG. 5 can alert the system to ignore these values.

The image capture function can be accomplished with either still or motion video devices or as pre-recorded digital data. All types of image data are input to the source image buffer 62 for processing as desired. Note that while the preferred mode for still image capture will come from previously captured images through a local host bus interface 76, the NTSC digitizer 60, for example, can provide real-time data from an external video camera. Any similar device that converts an image to the appropriate digital format for input to the source image buffer can be substituted for digitizer 60. In the same fashion, an electronic still imager, such as an electronic still camera, line scanner, or table scanner, can provide still image data for processing. Prerecorded distorted images generated through this invention's optical system can also be input through an additional conversion device to allow dynamic manipulation of previously recorded image data.

The image transformation performed on the captured digitized image from modified hemispheric coordinates to planar coordinates for display is one of a multitude of possible image transformations, any of which can be invoked in real-time for smooth merging of effects. These transformations include, but are not limited to pans, up/downs, zooms, tilts, rotations, scaling, cropping and image shear, which can be controlled using human or computer input. Image filtering can be performed as well as edge detection in associated processes during the course of manipulation. These services can be applied to any system image loaded into the source image buffer, thus providing a host of added features beyond the simple application of the hemispheric lens and display system.

The advantage of the image transformation logic becomes apparent when describing particular applications. A security camera application can be implemented to view an entire panorama such that the security monitor will display full-motion rate images in real-time. Source image coordinates for still images can also be sequenced, allowing perceived animation or full-motion renditions by simply reloading new source image coordinates into the warping engines as frames are drawn from memory. Details from other stored images can be utilized to give the effect of full-motion panning of the horizon within the captured image by the lens.

An additional feature of the present invention is its ability to create motion video presentations with a reduced set of still frames, as compared with the number of full-motion frames ordinarily required. For example, when a set of building storefronts is filmed with a traditional motion picture camera from the back of a moving truck, each frame contains the time-based content of the image entering the traditional lens and only one limited field of view is available at a time. With the system of the present invention, motion can be reconstructed from a greatly reduced subset of frames because the greater field of captured data already contains picture content from the next frame and previous frame due to its exceptionally wide angle. By analyzing picture content within a host computer program, intermediate frame equivalents sufficient to complete a full-motion data set can be constructed and fed to the source image buffer in sequence for processing. Alternatively, separate circuits operating at real-time rates can interpolate intermediate values and supply changes in transformation parameters for existing still images fast enough to synthesize motion sequences. Preference for one technique over another will be dependent on the specific application requirements and other development/market considerations.

Figure 7:
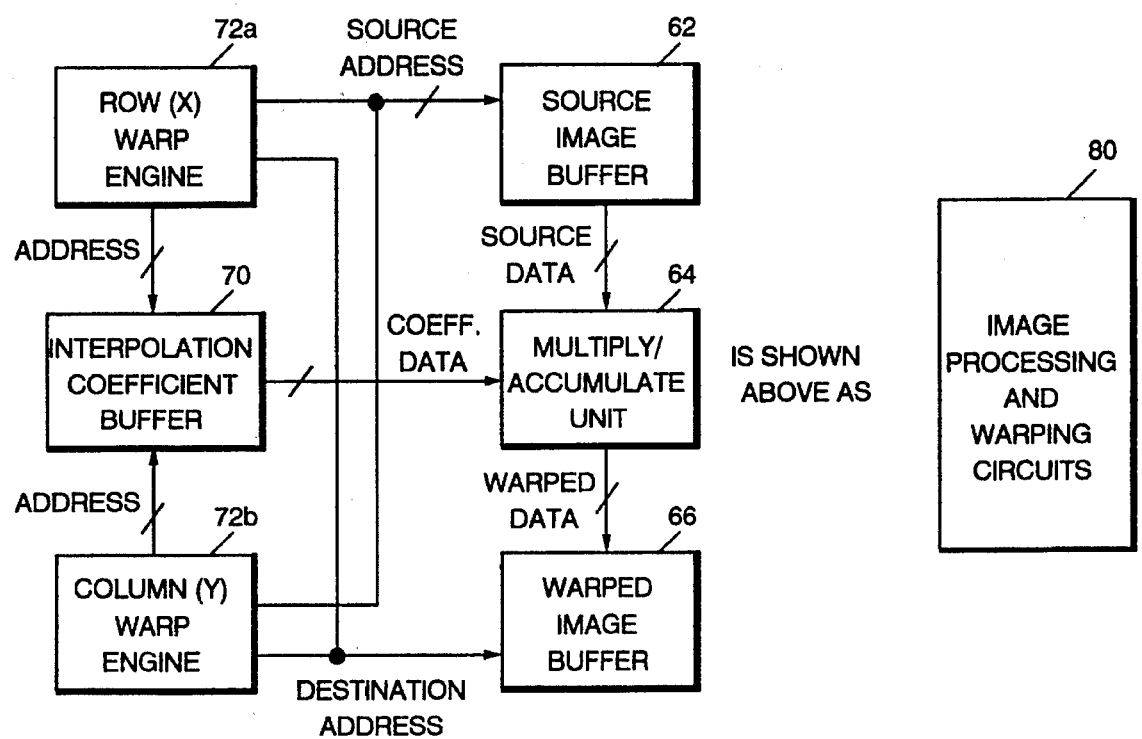
FIG. 7 is a block diagram schematically indicating further integration of a portion of the image processing circuitry of FIG. 6.
Figure 8:
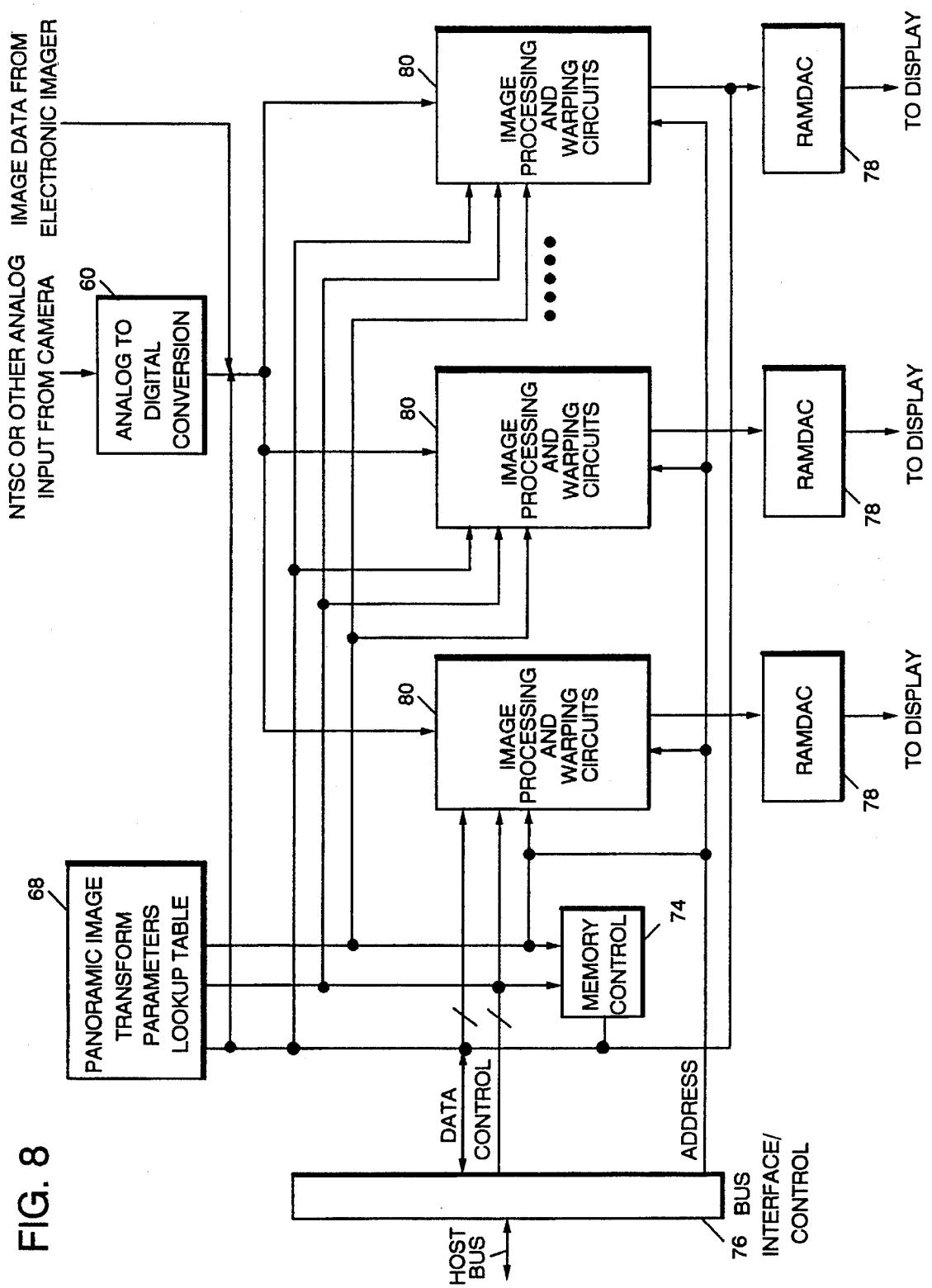
FIG. 8 is an alternate embodiment of the image processing circuitry of the present invention incorporating the integrated circuitry elements of FIG. 7.

Finally, the transform processor subsystem can produce multiple different outputs simultaneously from individual stored or currently-converted images. With the main transform processor circuits collected into a simplified single image processing subsystem 80 as shown in FIG. 7, multiple outputs may be generated from a single image source, either motion or still, with individual effects for each scene as desired, allowing several scenes on different display devices or several windows on a single display. This is accomplished by incorporating several image processing subsystems 80 within one overall system, as shown in FIG. 8.

In all cases, by having greater resolution of the peripheral image of a scene, the details of any objects along the horizon will be enhanced. Further, aberrations occurring around the periphery of the lens (i.e., spherical aberrations) can be more fully and completely compensated for, as the aberrations are spread across a greater area on the imager device.

As described above, the present invention provides a visual imaging system that efficiently captures, stores, and displays visual information about an enhanced hemispheric field of view existing particularly along the horizon, and that allows electronic manipulation and selective display thereof even after acquisition and storage, while minimizing distortion.

The principles, embodiments, and modes of operation of the present invention have been described in the foregoing specification. The invention that is intended to be protected herein should not, however, be construed to the particular form described as it is to be regarded as illustrative rather than restrictive. Variations and changes may be made by those skilled in the art without departing from the spirit of the present invention. Accordingly, the foregoing detailed description should be exemplary in nature and not limiting as to the scope and spirit of the invention as set forth in the appended claims.

What is claimed is:

1. A system for electronic imaging and manipulation of a hemispheric field of view, comprising:

a camera for receiving optical images of a hemispheric field of view and for producing output signals or affecting photographic film-based materials corresponding to the optical images:

an optical imaging device associated with said camera for producing optical images throughout the hemispheric field of view for optical conveyance to said camera, said optical system having a configuration adapted to capture and enhance an image of peripheral regions of the hemispheric field of view and for magnifying a portion of the field of view within a range of approximately one to forty-five degrees above the horizon of a captured image of a hemispheric field of view;

an image processing device associated with said camera and said optical imaging system for receiving optical images from said lens and for providing digitized output signals representative of the received optical images:

input image memory for receiving the digitized output signals from said imager device and for storing the digitized output signals;

image transform processing circuitry for selectively accessing and processing the digitized output signals from said input image memory according to user defined criteria;

output image memory for receiving the processed signals from the image transform processor, and an output display or recording device connected to said output image memory for recording the signals in said output image memory.

2. The system as in claim 1, wherein said image processing device is an electronic imager.

3. The system as in claim 2, wherein said image processing device is a charge-coupled device.

4. The system as in claim 1, wherein said optical system has a configuration which images a peripheral portion of the hemispheric scene onto at least 50% of an imaging area of an imaging device.

5. The system as in claim 4, wherein said optical system includes a wide field multi-element lens positioned to direct an image to a light transmitting fiber array.

6. The system as in claim 5 wherein the fiber array is geometrically arranged to have a generally annular input end and a generally rectangular output end.

7. The system as in claim 5, wherein the fiber array is geometrically arranged to have a generally annular input end and a generally circular output end.

8. The system of claim 5 wherein the fibers of the fiber array have an imaging accuracy on the order of three microns.

9. The system as in claim 5 wherein the focal length of the wide field lens is scaled to match a desired magnification of the peripheral field of view.

10. A system for electronic imaging and manipulation of a hemispheric field of view, comprising:

a camera for receiving optical images of a hemispheric field of view and for producing output signals or affecting photographic film-based materials corresponding to the optical images:

an optical imaging device associated with said camera for producing optical images throughout the hemispheric field of view for optical conveyance to said camera, said optical system having a configuration adapted to capture and enhance an image of peripheral regions of the hemispheric field of view, said optical imaging device including a color-aberrated multiple element wide field lens in combination with a gradient index hemispheric lens;

an image processing device associated with said camera and said optical imaging system for receiving optical images from said lens and for providing digitized output signals representative of the received optical images;

input image memory for receiving the digitized output signals from said imager device and for storing the digitized output signals;

image transform processing circuitry for selectively accessing and processing the digitized output signals from said input image memory according to user defined criteria;

output image memory for receiving the processed signals from the image transform processor, and an output display or recording device connected to said output image memory for recording the signals in said output image memory.

11. A system for electronic imaging and manipulation of a hemispheric field of view, comprising;

a camera for receiving optical images of a hemispheric field of view and for producing output signals or affecting photographic film-based materials corresponding to the optical images;

an optical imaging device associated with said camera for producing optical images throughout the hemispheric field of view for optical conveyance to said camera, said optical system having a configuration adapted to capture and enhance an image of peripheral regions of the hemispheric field of view and for magnifying a portion of the field of view within a range of approximately one to forty-five degrees above the horizon of a captured image of a hemispheric field of view and imaging the magnified portion of the hemispheric scene onto at least 50% of an imaging area of an imaging device;

an image processing device including photographic film associated with said camera and said optical imaging system for receiving optical images from said lens and for providing digitized output signals representative of the received optical images;

input image memory for receiving the digitized output signals from said imager device and for storing the digitized output signals;

image transform processing circuitry for selectively accessing and processing the digitized output signals from said input image memory according to user defined criteria:

output image memory for receiving the processed signals from the image transform processor, and an output display or recording device connected to said output image memory for recording the signals in said output image memory.

12. The system as in claim 11, further including a capture and conversion device that converts the optical images on said photographic film into digital output signals for input to said input image memory.

13. The system as in claim 12, wherein the capture and conversion device is an NTSC-to-digital converter.

14. The system as in claim 12, wherein data from the capture and conversion device is input to a source image frame buffer.

15. The system as in claim 14, wherein the image transform processing circuitry comprises an image re-sampling sequencer.

16. The system as in claim 15, wherein the image re-sampling sequencer controls address sequencing of pixels in the source image frame buffer.

17. The system as in claim 16, wherein the image transform processing circuitry further comprises row and column warp engines.

18. The system as in claim 17, wherein the image transform processing circuitry further comprises a warped image buffer connected to the warp engines and to which an output of the source image frame buffer is input.

19. The system as in claim 18, wherein the image transform processing circuitry further comprises a look-up table containing transformation parameters for perspective correction of hemispheric field of view images.

20. The system as in claim 18, wherein the image transform processing circuitry further comprises an interpolation coefficient buffer connected to said look-up table to update said transformation parameters, and connected to a multiply/accumulate unit.

21. The system as in one of claim 1 or claim 10 or claim 11, wherein said output display is worn on or attached to a viewer's head, so that the orientation of the viewer with respect to the imaged surroundings is electronically conveyed and interpreted as user controls.

22. A system for imaging and manipulation of a hemispheric field of view comprising:

(i) an optical system for producing an optical image of a hemispherical field of view, said optical system having a central lens axis coaxial with a central axis of the hemispherical field of view and a configuration which emphasizes through differential magnification of peripheral content of the hemispherical field of view, said optical image having a defined usable image area when projected onto a plane;

(ii) a camera optically coupled to said optical system for receiving optical images of the hemispherical field of view and for producing an output corresponding to the optical images;

(iii) input image memory coupled to said camera for receiving and storing the output from said camera;

(iv) a processor coupled to said input image memory for selectively accessing from said input image memory and processing output from said camera, said processor for transforming the output from the camera according to user defined criteria into a processor output which has a peripheral image content emphasis which differs from that of said optical system;

(v) output image memory coupled to said processor for receiving and storing the processor output; and (vi) an output device coupled to said output image memory for rendering the stored processor output into a visual image transformed from the optical image in accordance with the user defined criteria.

23. A system according to claim 22 wherein said optical system has a configuration that images the peripheral portion of a hemispherical scene onto a portion of the optical image usable image area which is no more than about ninety percent of the optical image usable image area.

24. A system according to claim 22 wherein said optical system comprises:

a wide field multi-element lens; and a coordinated fiber array geometrically arranged to have a generally annular input end and a generally rectangular output end.

25. A system according to claim 22 wherein said optical system comprises:

a wide field multi-element lens; and a coordinated fiber array geometrically arranged to have a generally annular input end and a generally annular output end.

26. A system according to claim 22 wherein said optical system comprises:

a color-aberrated wide field lens; and a gradient index hemispheric lens.

27. A system according to claim 22 wherein said output device comprises a visual display device for displaying a visual image closely adjacent the eyes of an observer.

28. A system according to claim 27 wherein said processor generates processor output which represents a selected portion of the hemispherical field of view, and said system further comprises:

sensors for detecting the orientation of the head or eyes of an observer, and a link between said sensors to said processor for modifying the generation of processor output as a function of the detected orientation of the head or eyes of an observer.

29. A system according to claim 22 wherein said optical system has a configuration that images the peripheral portion of a hemispherical scene onto a portion of the optical image usable image area which is at least about fifty percent of the optical image usable image area.

30. A system according to claim 29 wherein said optical system has a configuration that images the peripheral portion of a hemispherical scene onto a portion of the optical image usable image area which ranges from about fifty percent to about ninety percent of the optical image usable image area.

31. A system according to claim 29 wherein said optical system has a configuration which emphasizes through differential magnification at least a portion of that content of the hemispherical field of view which lies between a base plane of the hemispherical field of view and a right cone defined about said central lens axis, said cone having an included angle of forty five degrees between said central lens axis and a line generating said cone and with said line generating said cone passing through the point of intersection of said central lens axis with said base plane.

32. A system according to claim 22 further comprising an imager device interposed between said camera and said input image memory for receiving said output from said camera and for generating a digitized output, and further wherein said input image memory, said processor, and said output image memory receive, store and process said digitized output.

33. A system according to claim 32 wherein said camera comprises a light sensitive electronic image capture element and said imager device comprises an electronic digitizer circuit.

34. A system according to claim 32 further comprising photographic film for photographically capturing said output from said camera and further wherein said imager device comprises a capture and conversion device which converts the photographically captured output from said camera into said digitized output.

35. A system according to claim 22 wherein said processor comprises image processing and warping circuitry for transforming the output from the camera according to user defined criteria into a processor output which has a peripheral content emphasis which differs from that of said optical system.

36. A system according to claim 35 wherein said image processing and warping circuit comprises an arithmetic logic unit (ALU), and further wherein said processor comprises a storage memory device coupled to said ALU for receiving and storing control programs for determining the functions served by said ALU, and a control program stored in said storage memory device and accessible to said ALU for controlling the operation of said ALU to transform the output from the camera according to user defined criteria into a processor output which has a peripheral/central content emphasis which differs from that of said optical system.

37. A system according to claim 35 wherein said processor generates processor output which represents a selected portion of the hemispherical field of view.

38. A method for electronically capturing, storing, and manipulating a hemispheric field of view, comprising the steps of:

providing an optical system having a configuration that enhances the peripheral portion of the field of view, capturing the hemispheric field of view with the periphery-enhancing optical system and imaging the field of view onto an imager device while enhancing the peripheral field of view by selectively magnifying the visual content within an arc of between 10 and 45 degrees up from the horizon storing the captured image as a single image, selectively accessing a portion of the stored image to user-defined criteria, transforming the stored image so that the stored image can be displayed as a perspective-correct image, and displaying the perspective-correct image in a user-defined format.

39. The method as in claim 38, wherein said transforming step comprises manipulating the peripheral-enhanced image into a perspective-correct image.

40. The method as in claim 38, wherein the storage step comprises storing the captured image in electronic storage.

41. A method for electronically capturing, storing, and manipulating a hemispheric field of view, comprising the steps of:

providing an optical system having a configuration that enhances the peripheral portion of the field of view, capturing the hemispheric field of view with the periphery-enhancing optical system and imaging the field of view onto an imager device by enhancing the peripheral field of view, storing the captured image onto photographic film as a single image;

selectively accessing a portion of the stored image according to user-defined criteria including converting the image from the photographic film into digital output format, transforming the stored image so that the stored image can be displayed as a perspective-correct image, and displaying the perspective-correct image in a user-defined format.

42. A method for electronically manipulating a hemispheric scene having an enhanced peripheral field of view stored as an image on photographic film, comprising the steps of:

converting the image on the photographic film into electronic output signals, selectively accessing a portion of the output signals according to user-defined criteria, transforming the accessed portion of the output signals by manipulating the peripheral-enhanced field of view so that the stored image can be displayed as a perspective-correct image, and displaying the perspective-correct image in the user-defined format.

43. A method for generating image sequences over physical distances from a reduced set of enhanced-periphery hemispheric images, wherein intermediate images are interpolated from a combination of adjacent hemispheric images, the method comprising the steps of:

defining how many intermediate images are needed to satisfy the simulation of motion-video or film-based movie cameras;

interpolating needed intermediate images from a combination of adjacent hemispheric images;

identifying or electronically tagging interpolated images, then storing or recording them for later introduction to the image processing subsystem;

loading original and interpolated image data sets in appropriate sequence to the image processing subsystem at rates sufficient to simulate real-time motion video, and displaying the perspective-correct image in the user-defined format.

44. A system for electronic manipulation of a hemispheric scene, comprising:

a camera imaging system for imaging a hemispheric field of view;

an optical system associated with said camera imaging system for producing the optical images throughout the field of view for optical conveyance to said camera imaging system;

an imager device associated with said camera for receiving the optical images from said lens and for providing digitized output signals;

input image memory for receiving the digitized output signals from said imaging device and for storing the digitized output signals;

image transform processor circuitry for selectively accessing and processing the digitized output signals from said input image memory according to user-defined criteria;

output image memory for receiving the processed signals from the image transform processor means; and an output display device or electronic recording device connected to said output image memory for displaying or recording the signals in said output image memory according to user-defined criteria;

said optical system having a configuration that emphasizes the peripheral content of the field of view of a hemispheric scene as compared to the central content, such that said imager device receives magnified optical images of the peripheral portion of the hemispheric field of view.

* * * * *